US012661872B2

(12) United States Patent (10) Patent No.: US 12,661,872 B2

Uchida et al. (45) Date of Patent: Jun. 23, 2026

(54) METHOD FOR MANUFACTURING GLASS SHEET COMPOSITE

(71) Applicant: AGC Inc., Tokyo (JP)

(72) Inventors: Daisuke Uchida, Tokyo (JP); Kiichi Takeuchi, Tokyo (JP)

(73) Assignee: AGC INC., Tokyo (JP)

( * ) Notice: Subject to any disclaimer, the term of this patent is extended or adjusted under 35 U.S.C. 154(b) by 440 days.

(21) Appl. No.: 18/136,656

(22) Filed: Apr. 19, 2023

(65) Prior Publication Data

US 2023/0256716 A1 Aug. 17, 2023

Related U.S. Application Data

(63) Continuation of application No. PCT/JP2021/038466, filed on Oct. 18, 2021.

(30) Foreign Application Priority Data

Oct. 21, 2020 (JP) ................................. 2020-176882

(51) Int. Cl.
*B32B 17/10* (2006.01)
*B32B 1/00* (2024.01)
*B32B 37/10* (2006.01)

(52) U.S. Cl.
CPC .......... *B32B 17/10036* (2013.01); *B32B 1/00* (2013.01); *B32B 17/10798* (2013.01); *B32B 37/1009* (2013.01); *B32B 2250/02* (2013.01); *B32B 2307/10* (2013.01); *B32B 2309/12* (2013.01); *B32B 2315/08* (2013.01); *B32B 2383/00* (2013.01); *B32B 2429/00* (2013.01)

(58) Field of Classification Search
None
See application file for complete search history.

(56) References Cited

U.S. PATENT DOCUMENTS

| | | | |
|---|---|---|---|
| 10,809,424 B2 | 10/2020 | Kawai et al. | |
| 2018/0229477 A1* | 8/2018 | Koike | G03F 1/48 |
| 2019/0030862 A1 | 1/2019 | Akiyama | |

(Continued)

FOREIGN PATENT DOCUMENTS

| | | | | |
|---|---|---|---|---|
| EP | 3588976 A1 * | 1/2020 | ........... | H04R 31/003 |
| JP | S57-077050 A | 5/1982 | | |

(Continued)

OTHER PUBLICATIONS

JP 2003321258 A Eng TRANS (Year: 2003).*

(Continued)

*Primary Examiner* — Jeffrey D Washville
(74) *Attorney, Agent, or Firm* — Foley & Lardner LLP

(57) ABSTRACT

The present invention relates to a method for manufacturing a glass sheet composite including two or more sheets and an intermediate layer between at least a pair of sheets of the sheets, the pair of the sheets consisting of a sheet 1A and a sheet 1B, at least one of the sheet 1A and the sheet 1B being a glass sheet, and the method including: applying a liquid agent for the intermediate layer and a sealant to at least a part of a main surface of the sheet 1A; bonding the sheet 1B to the main surface of the sheet 1A to which the liquid agent for the intermediate layer and the sealant are applied to obtain a laminate; and subjecting the laminate to reduced pressure.

15 Claims, 2 Drawing Sheets

(56) References Cited

U.S. PATENT DOCUMENTS

| | | | |
|---|---|---|---|
| 2019/0387322 A1 * | 12/2019 | Akiyama ........... | B32B 17/10045 |
| 2020/0021916 A1 | 1/2020 | Akiyama et al. | |
| 2020/0223187 A1 | 7/2020 | Sakurai et al. | |
| 2020/0230922 A1 | 7/2020 | Sakurai et al. | |
| 2020/0233455 A1 | 7/2020 | Sakurai et al. | |
| 2020/0238665 A1 | 7/2020 | Sakurai et al. | |
| 2020/0404412 A1 | 12/2020 | Akiyama et al. | |
| 2022/0363034 A1 | 11/2022 | Akiyama | |

FOREIGN PATENT DOCUMENTS

| | | | |
|---|---|---|---|
| JP | 2000-017956 A | | 1/2000 |
| JP | 2003321258 A | * | 11/2003 |
| WO | WO-98/56727 A1 | | 12/1998 |
| WO | WO-2017/175682 A1 | | 10/2017 |

OTHER PUBLICATIONS

Mal et al., "A Novel Glass Laminated Structure for Flat Panel Loudspeakers," Audio Engineering Society, Convention Paper, Presented at the 124th Convention in Amsterdam, The Netherlands, May 17-20, 2008, pp. 1-6.

International Searching Authority, "International Search Report," issued in connection with International Patent Application No. PCT/JP2021/038466, dated Jan. 11, 2022.

International Searching Authority, "Written Opinion," issued in connection with International Patent Application No. PCT/JP2021/038466, dated Jan. 11, 2022.

* cited by examiner

1A 2    3

METHOD FOR MANUFACTURING GLASS SHEET COMPOSITE

CROSS-REFERENCE TO RELATED APPLICATIONS

This is a bypass continuation of International Patent Application No. PCT/JP2021/038466, filed on Oct. 18, 2021, which claims priority to Japanese Patent Application No. 2020-176882, filed on Oct. 21, 2020. The contents of these applications are hereby incorporated by reference in their entireties.

TECHNICAL FIELD

The present invention relates to a method for manufacturing a glass sheet composite in which an intermediate layer such as a liquid layer is provided between at least a pair of sheets.

BACKGROUND ART

Glass, which is a material having a high propagation acoustic velocity as a diaphragm for speakers or microphones, attracts attention. Here, a high frequency band of 20 kHz or more is poorly audible by human ears but makes a person feel a strong realistic sensation, and thus a faithful reproduction is required. As a glass sheet composite having good acoustic performance even in the band, Patent Literature 1 describes a glass sheet composite in which a liquid layer is provided between at least a pair of sheets.

Patent Literature 1: WO 2017/175682

SUMMARY OF INVENTION

When the liquid layer of the glass sheet composite described in Patent Literature 1 contains bubbles, there are concerns that the appearance is significantly impaired, the bubbles act as a damping effect, two sheets do not have the same amplitude and good acoustic performance is less likely to be exhibited, the internal pressure and size of the bubbles easily change at the ambient temperature and acoustic performance with good reproduction is less likely to be exhibited, and the like. Therefore, the intermediate layer such as the liquid layer preferably does not contain bubbles.

In order not to contain bubbles in the intermediate layer such as the liquid layer, the present inventors have studied a method of applying a liquid agent for the intermediate layer and a sealant to one sheet, then subjecting the sheet to reduced pressure, and laminating another sheet (vacuum lamination method), but it is difficult to completely remove bubbles.

Thus, an object of the present invention is to provide a method for manufacturing a glass sheet composite in which an intermediate layer such as the liquid layer is provided at least between a pair of sheets without containing bubbles.

As a result of intensive studies, the present inventors have found that the problems can be solved by the following manufacturing method.

[1] A method for manufacturing a glass sheet composite including two or more sheets and an intermediate layer between at least a pair of sheets of the sheets, the pair of the sheets consisting of a sheet 1A and a sheet 1B, at least one of the sheet 1A and the sheet 1B being a glass sheet, and the method including:

applying a liquid agent for the intermediate layer and a sealant to at least a part of a main surface of the sheet 1A;

bonding the sheet 1B to the main surface of the sheet 1A to which the liquid agent for the intermediate layer and the sealant are applied to obtain a laminate; and subjecting the laminate to reduced pressure.

[2] The method for manufacturing a glass sheet composite according to [1], in which the reduced pressure is achieved by a decompression chamber, and (space volume (L) in the decompression chamber/exhaust capacity (L/min) in the decompression chamber) is 1.8 or less.

[3] The method for manufacturing a glass sheet composite according to [1] or [2], in which when the laminate is subjected to the reduced pressure, a pressure is reduced to 100 Pa or less in 1 minute to 180 minutes.

[4] The method for manufacturing a glass sheet composite according to any one of [1] to [3], in which a viscosity coefficient of the sealant is larger than a viscosity coefficient of the liquid agent for the intermediate layer.

[5] The method for manufacturing a glass sheet composite according to any one of [1] to [4], in which the sealant has a viscosity coefficient of $1 \times 10^{-1}$ Pa·s or more, and the liquid agent for the intermediate layer has a viscosity coefficient of $1 \times 10^3$ Pa·s or less.

[6] The method for manufacturing a glass sheet composite according to any one of [1] to [5], in which the liquid agent for the intermediate layer includes a silicone.

[7] The method for manufacturing a glass sheet composite according to any one of [1] to [6], in which the liquid agent for the intermediate layer has a coating pattern of a layer pattern, a dot pattern, a lattice pattern, or a stripe pattern.

[8] The method for manufacturing a glass sheet composite according to any one of [1] to [7], in which a coating thickness of the sealant is larger than a coating thickness of the liquid agent for the intermediate layer.

[9] The method for manufacturing a glass sheet composite according to any one of [1] to [8], in which the liquid agent for the intermediate layer has a coating thickness of 5 μm to 500 μm.

[10] The method for manufacturing a glass sheet composite according to [8] or [9], in which the sealant has a coating thickness of 10 μm to 1000 μm.

[11] The method for manufacturing a glass sheet composite according to any one of [1] to [10], further including pressurizing the laminate after the laminate is subjected to the reduced pressure.

[12] The method for manufacturing a glass sheet composite according to [11], in which the pressurization is performed by compressing the laminate at a pressure of 0.1 MPa to 10 MPa for 1 minute to 30 minutes.

[13] The method for manufacturing a glass sheet composite according to any one of [1] to [12], in which the sealant contains a curable resin, and the method further includes curing the sealant after the laminate is subjected to the reduced pressure.

[14] The method for manufacturing a glass sheet composite according to any one of [1] to [13], in which the liquid agent for the intermediate layer includes a curable resin, and the method further includes curing the liquid agent for the intermediate layer after the laminate is subjected to the reduced pressure.

[15] The method for manufacturing a glass sheet composite according to any one of [1] to [14], in which each of the sheets has a curved surface.

[16] The method for manufacturing a glass sheet composite according to any one of [1] to [15], in which the sheet 1A and the sheet 1B are bonded to each other under normal pressure.

According to the manufacturing method of the present invention, a glass sheet composite can be manufactured without containing bubbles in an intermediate layer such as a liquid layer.

In addition, since the intermediate layer such as the liquid layer (hereinafter, also simply referred to as an "intermediate layer") does not contain bubbles, the obtained glass sheet composite has excellent appearance, two sheets thereof do not have the same amplitude and have good acoustic performance, and acoustic performance with good reproduction is exhibited even when an ambient temperature changes.

BRIEF DESCRIPTION OF DRAWINGS

Each of FIGS. 1A to 1D is a process diagram illustrating an example of a method for manufacturing a glass sheet composite according to the present invention.

DESCRIPTION OF EMBODIMENTS

<Method for Manufacturing Glass Sheet Composite>

The present invention relates to a method for manufacturing a glass sheet composite including two or more sheets and including an intermediate layer such as a liquid layer between at least a pair of sheets of the sheets, where at least one sheet out of the pair of sheets is a glass sheet.

Figure 1A:
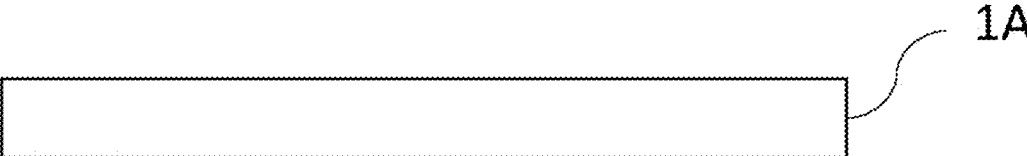
FIG. 1A Illustrates a process of preparing a sheet 1A.
Figure 1B:
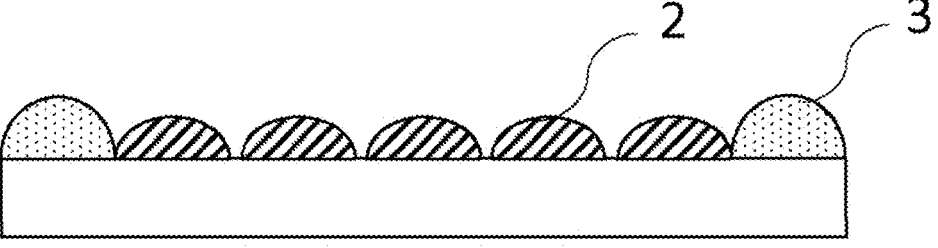
FIG. 1B Illustrates a process of applying a liquid agent 2 for an intermediate layer and a sealant 3 to at least a part of a main surface (first main surface) of the sheet 1A.
Figure 1C:
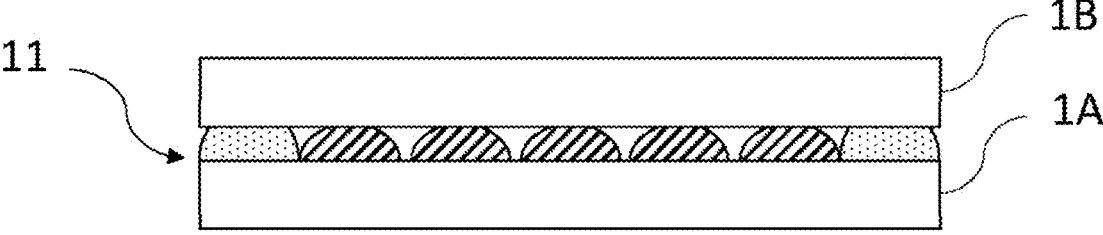
FIG. 1C Illustrates a process of bonding the other sheet 1B to the applied surface of the sheet 1A to obtain a laminate 11.
Figure 1D:
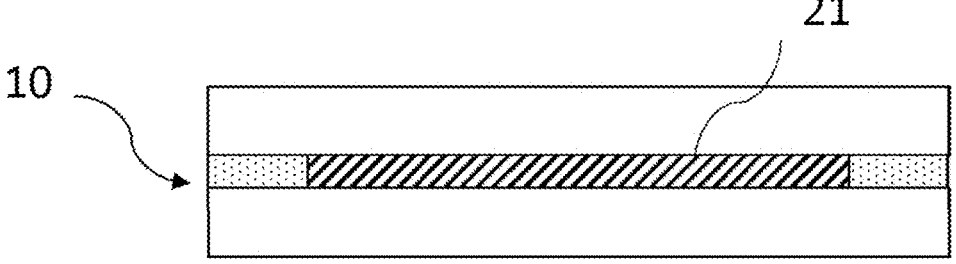
FIG. 1D Illustrates a process of obtaining a glass sheet composite 10 including an intermediate layer 21 between the sheet 1A and the sheet 1B by subjecting the laminate 11 to reduced pressure.

Each of FIGS. 1A to 1D is a process diagrams illustrating an example of a method for manufacturing the glass sheet composite according to the present invention. As illustrated in FIG. 1B, a liquid agent 2 for an intermediate layer and a sealant 3 are applied to at least a part of a main surface (first main surface) of one sheet 1A of a pair of sheets. As illustrated in FIG. 1C, a laminate 11 is obtained by bonding the other sheet 1B to the applied surface of the sheet 1A. As illustrated in FIG. 1D, the laminate 11 is subjected to reduced pressure to obtain a glass sheet composite 10 including an intermediate layer 21 between the sheet 1A and the sheet 1B. The intermediate layer 21 may be a layer made of a liquid or a layer made of a solid obtained by curing the liquid. In the method for manufacturing a glass sheet composite according to the present invention, a glass sheet composite in which the intermediate layer 21 does not contain bubbles can be manufactured.

(Sheet and Glass Sheet)

In the glass sheet composite of the present invention, due to the presence of the intermediate layer such as the liquid layer, the pair of sheets are not fixed and continue exhibiting vibration characteristics of each individual sheet, unlike the case of providing a pair of sheets with an adhesive layer therebetween. That is, in the case where one sheet 1A resonates, the presence of the intermediate layer such as the liquid layer can prevent the other sheet 1B from resonating or can damp resonant vibration of the sheet 1B, so that the glass sheet composite has a high loss coefficient, compared to sheets alone.

Out of two sheets constituting the pair of sheets, a peak top value of resonant frequency of the one sheet 1A preferably differs from that of the other sheet 1B, and it is more preferable that the ranges of resonant frequencies do not overlap each other. However, even in the case where the ranges of resonant frequencies of the sheet 1A and the sheet 1B overlap each other or the peak top value is the same, at the time of resonation of the one sheet, the vibration of the other sheet is not synchronized due to the presence of the intermediate layer such as the liquid layer, and the resonation is thereby canceled to a certain extent, so that a high loss coefficient can be obtained, compared to sheets alone.

That is, denoting $Qa$ and $wa$ respectively as the resonant frequency (peak top) of the sheet 1A and the half-width of resonance amplitude of the sheet 1A and denoting $Qb$ and $wb$ respectively as the resonant frequency (peak top) of the other sheet 1B and the half-width of resonance amplitude of the other sheet 1B, it is preferable to satisfy the relationship of the following Formula 1.

$$(wa+wb)/4 < |Qa-Qb| \qquad \text{[Formula 1]}$$

As the value on the left side in Formula 1 is larger, the difference ($|Qa-Qb|$) in the resonant frequency between the sheet 1A and the sheet 1B becomes larger, and a high loss coefficient is advantageously obtained.

Therefore, it is more preferable to satisfy the following Formula 1', and it is still more preferable to satisfy the following Formula 1".

$$(wa+wb)/2 < |Qa-Qb| \qquad \text{[Formula 1']}$$

$$(wa+wb)/1 < |Qa-Qb| \qquad \text{[Formula 1'']}$$

The resonant frequency (peak top) and the half-width of resonance amplitude of the sheet can be measured by the same method as that for the loss coefficient in the glass sheet composite.

A mass difference between the sheet 1A and the sheet 1B is preferably smaller, and it is more preferred that there is no mass difference. In the case where the sheets have the mass difference, resonation of a lighter sheet can be reduced by a heavier sheet, but it is difficult to reduce resonation of the heavier sheet by the lighter sheet. That is, this is because in the case where a mass ratio is imbalance, in principle resonant vibrations cannot be mutually canceled due to the difference in inertial force.

A mass ratio of the sheet 1A and the sheet 1B, represented by (sheet 1A/sheet 1B), is preferably 0.8 to 1.25 (8/10 to 10/8), more preferably 0.9 to 1.1 (9/10 to 10/9), and still more preferably 1.0 (10/10).

In both of the sheet 1A and the sheet 1B, as the thickness is smaller, the sheets are more readily adhered to each other via a liquid layer, and the sheet can be vibrated with less energy. Therefore, in the application as a diaphragm for speakers or the like, the smaller the sheet thickness, the better. Specifically, the sheet thickness of each of the sheet 1A and the sheet 1B is preferably 15 mm or less, more preferably 10 mm or less, still more preferably 5 mm or less, yet still more preferably 3 mm or less, even still more preferably 1.5 mm or less, and particularly preferably 0.8 mm or less. On the other hand, if the thickness is too small, effects of surface defects of the sheet are likely to be revealed, and cracking occurs more easily, or a strengthening treatment is difficult to apply. For this reason, the thickness is preferably 0.01 mm or more, and more preferably 0.05 mm or more.

In the application as an opening member for buildings and vehicles, which reduces occurrence of an abnormal noise attributed to a resonance phenomenon, the sheet thickness of each of the sheet 1A and the sheet 1B is preferably 0.5 mm to 15 mm, more preferably 0.8 mm to 10 mm, and still more preferably 1.0 mm to 8 mm.

In the application as a glass substrate for magnetic recording mediums, of which vibration absorbing effect is enhanced, the sheet thickness of each of the sheet 1A and the sheet 1B is preferably 0.3 mm to 1.2 mm, more preferably 0.4 mm to 1.0 mm, and still more preferably 0.5 mm to 0.8 mm.

In the preferred application as a diaphragm, at least one of the sheet 1A and the sheet 1B preferably has a high loss coefficient, because increased vibration damping is achieved by the glass sheet composite. Specifically, the loss coefficient at 25° C. of the sheet is preferably $1\times10^{-4}$ or more, more preferably $3\times10^{-4}$ or more, and still more preferably $5\times10^{-4}$ or more. The upper limit is not particularly limited, but the loss coefficient is preferably $5\times10^{-3}$ or less from the viewpoint of productivity and manufacturing cost. It is more preferred that both of the sheet 1A and the sheet 1B have the above loss coefficient.

In the preferred application as a diaphragm, at least one of the sheet 1A and the sheet 1B preferably has a high longitudinal wave acoustic velocity in a sheet thickness direction, because the sound reproducibility in a high frequency region is enhanced. Specifically, the longitudinal wave acoustic velocity of the sheet is preferably $5.5\times10^3$ m/s or more, more preferably $5.7\times10^3$ m/s or more, and still more preferably $6.0\times10^3$ m/s or more. The upper limit is not particularly limited but is preferably $7.0\times10^3$ m/s or less from the viewpoint of the productivity of the sheet and the raw material cost. It is more preferred that both of the sheet 1A and the sheet 1B satisfy the above acoustic velocity.

In the glass sheet composite according to the present invention, at least one of one sheet and the other sheet is constituted of a glass sheet. Here, the glass sheet means an inorganic glass and an organic glass. Examples of the organic glass include a PMMA resin, a PC resin, a PS resin, a PET resin, and a cellulose resin, which are generally well known as a transparent resin.

The other sheet is constituted of any material, and various materials such as a resin sheet made of a resin other than the organic glass, a metal sheet made of aluminum or the like, and a ceramics sheet made of ceramics can be adopted. From the viewpoints of design attractiveness or processability, and a weight, it is preferable to use the organic glass, a resin material, a composite material or a fiber material, a metal material, or the like, and from the viewpoint of a vibration characteristic, it is preferable to use the inorganic glass, a highly rigid composite material or fiber material, a metal material, or a ceramics material.

As the resin material, it is preferable to use a resin material that can be molded into a flat sheet shape or a curved sheet shape. As the composite material or the fiber material, it is preferable to use a resin material or a carbon fiber which is compounded with a high-hardness filler, a Kevlar fiber, or the like. As the metal material, aluminum, magnesium, copper, silver, gold, iron, titanium, SUS, and the like are preferable, and other alloy materials and the like may be used as necessary.

As the ceramics material, for example, ceramics such as $Al_2O_3$, SiC, $Si_3N_4$, AlN, mullite, zirconia, yttria, and YAG, and a single crystal material are more preferable. More preferably, the ceramics material is a material having a light-transmitting property.

In the case where the inorganic glass is used in the glass sheet constituting at least one sheet, a composition is not particularly limited, but is preferably in the following range, for example, in terms of mass % based on oxides.

$SiO_2$: 40 mass % to 80 mass %, $Al_2O_3$: 0 mass % to 35 mass %, $B_2O_3$: 0 mass % to 15 mass %, MgO: 0 mass % to 20 mass %, CaO: 0 mass % to 20 mass %, SrO: 0 mass % to 20 mass %, BaO: 0 mass % to 20 mass %, $Li_2O$: 0 mass % to 20 mass %, $Na_2O$: 0 mass % to 25 mass %, $K_2O$: 0 mass % to 20 mass %, $TiO_2$: 0 mass % to 10 mass %, and $ZrO_2$: 0 mass % to 10 mass %. The above composition accounts for 95 mass % or more of the entire glass.

The composition of the inorganic glass sheet is more preferably in the following range.

$SiO_2$: 55 mass % to 75 mass %, $Al_2O_3$: 0 mass % to 25 mass %, $B_2O_3$: 0 mass % to 12 mass %, MgO: 0 mass % to 20 mass %, CaO: 0 mass % to 20 mass %, SrO: 0 mass % to 20 mass %, BaO: 0 mass % to 20 mass %, $Li_2O$: 0 mass % to 20 mass %, $Na_2O$: 0 mass % to 25 mass %, $K_2O$: 0 mass % to 15 mass %, $TiO_2$: 0 mass % to 5 mass %, and $ZrO_2$: 0 mass % to 5 mass %. The above composition accounts for 95 mass % or more of the entire glass.

As a specific gravity is smaller in both the sheet 1A and the sheet 1B, the sheet can be vibrated with less energy. Specifically, the specific gravity of each of the sheet 1A and the sheet 1B is preferably 2.8 or less, more preferably 2.6 or less, and still more preferably 2.5 or less. The lower limit of the specific gravity is not particularly limited but is preferably 2.2 or more.

In the case where the specific modulus, which is a value obtained by dividing the Young's modulus of both the sheet 1A and the sheet 1B by the density thereof, is larger, the rigidity of the sheet can be increased. Specifically, the specific modulus of each of the sheet 1A and the sheet 1B is preferably $2.5\times10^7$ $m^2/s^2$ or more, more preferably $2.8\times10^7$ $m^2/s^2$ or more, and still more preferably $3.0\times10^7$ $m^2/s^2$ or more. The upper limit of the specific modulus is not particularly limited but is preferably $4.0\times10^7$ $m^2/s^2$ or less.

The shape of the sheet is not particularly limited, and may be planar or curved.

(Coating of Liquid Agent for Intermediate Layer and Sealant)

In the manufacturing method of the present invention, the liquid agent for the intermediate layer and the sealant are applied to at least a part of the main surface (first main surface) of the one sheet 1A out of the pair of sheets.

The liquid agent for the intermediate layer (hereinafter, simply referred to as a liquid agent) is a material constituting the intermediate layer of the glass sheet composite.

From the viewpoint of realizing a high loss coefficient of the glass sheet composite, a viscosity coefficient at 25° C. of the liquid agent is preferably $1\times10^3$ Pa·s or less, and more preferably $1\times10^{-4}$ Pa·s or more. In the case where the viscosity is too low, vibration can be hard to transmit, and in the case where the viscosity is too high, a pair of sheets located on both sides of the liquid layer are fixed to each other and exhibit a vibration behavior as one sheet, making damping of resonant vibration difficult. The viscosity coefficient is more preferably $1\times10^{-3}$ Pa·s or more, and still more preferably $1\times10^{-2}$ Pa·s or more. Further, the viscosity coefficient is more preferably $1\times10^2$ Pa·s or less, and still more preferably $1\times10$ Pa·s or less. The viscosity coefficient can be measured by a rotational viscometer or the like.

From the viewpoint of realizing a high loss coefficient of the glass sheet composite, a surface tension at 25° C. of the liquid agent is preferably 15 mN/m to 80 mN/m. In the case where the surface tension is too low, the adhesion between the sheets decreases, and vibration can be hard to be transmitted. In the case where the surface tension is too high, a pair of sheets located on both sides of the liquid layer are readily fixed to each other and exhibit a vibration behavior as one sheet, making damping of resonant vibration difficult. The surface tension is more preferably 20 mN/m or more, and still more preferably 30 mN/m or more. The surface tension can be measured by a ring method or the like.

In the case where the vapor pressure of the liquid layer is too high, the liquid layer may evaporate, resulting in failing to function as a glass sheet composite. Therefore, the vapor pressure at 25° C. and 1 atm of the liquid agent for the intermediate layer is preferably $1\times10^4$ Pa or less, more preferably $5\times10^3$ Pa or less, and still more preferably $1\times10^3$ Pa or less.

In the case where the intermediate layer is a liquid layer, it is preferred that the liquid layer is chemically stable and a reaction does not occur between the liquid layer and the sheet. The "chemically stable" means, for example, to undergo little degradation (deterioration) by light irradiation or not to cause solidification, vaporization, decomposition, discoloration, chemical reaction with glass, or the like at least in a temperature region of −20° C. to 70° C. On the other hand, in the case where the intermediate layer is a solid layer obtained by curing a liquid layer, the intermediate layer can be realized through a predetermined curing means, for example, ultraviolet curing or thermal curing.

Specific examples of the liquid agent for the intermediate layer includes water, oil, an organic solvent, a liquid polymer, an ionic liquid, a curable resin, and a mixture thereof.

More specifically, examples of the liquid agent for the intermediate layer include propylene glycol, dipropylene glycol, tripropylene glycol, a straight silicone oil (dimethyl silicone oil, methyl phenyl silicone oil, methyl hydrogen silicone oil), a denatured silicone oil, an acrylic acid polymer, an acrylic polymer, a urethane polymer, a silicone polymer, liquid polybutadiene, glycerin paste, a fluorine solvent, a fluorine resin, acetone, ethanol, xylene, toluene, water, mineral oil, and a mixture thereof. Among these, in the case where the intermediate layer is a liquid layer, it is preferable to contain at least one selected from the group consisting of propylene glycol, a dimethyl silicone oil, a methyl phenyl silicone oil, a methyl hydrogen silicone oil, and a denatured silicone oil, and it is more preferable to contain propylene glycol or a silicone oil as a main component. In the case where the silicone oil is used as a main component, the intermediate layer such as the liquid layer easily dissolves air, and thus formation of bubbles can be advantageously prevented. In the case where the intermediate layer is the solid layer, the intermediate layer preferably contains a curable resin such as an acrylic polymer, a urethane polymer, and a silicone polymer.

From the viewpoint of being able to impart design or functionality such as coloration or fluorescence to the glass sheet composite, the liquid agent for the intermediate layer may be slurry in which powder is dispersed, and the liquid agent for the intermediate layer may contain a fluorescent material.

The content of the powder in the liquid agent for the intermediate layer is preferably 0 vol % to 10 vol %, and more preferably 0 vol % to 5 vol %. From the viewpoint of preventing sedimentation, a particle diameter of the powder is preferably 10 nm to 1 μm, and more preferably 10 nm to 0.5 μm.

The sealant is applied to prevent leakage of the liquid agent and to prevent peeling at an interface between the sheets and the intermediate layer (liquid layer) of the glass sheet composite.

The sealant is required not to flow out at the time of coating and to have a strength enough to withstand the weight of the sheet at the time of bonding. From this point of view, the viscosity coefficient at 25° C. is preferably $1\times10^{-1}$ Pa·s or more, and more preferably 1 Pa·s or more. From the viewpoint of good handleability of coating and from the viewpoint of applying with a certain leveling property and a narrow seal width, the viscosity coefficient at 25° C. is preferably $1\times10^3$ Pa·s or less, and more preferably $1\times10^2$ Pa·s or less.

From the viewpoint of efficiently removing bubbles from the intermediate layer, the viscosity coefficient of the sealant is preferably larger than the viscosity coefficient of the liquid agent. In the case where the bubbles remaining in the intermediate layer (liquid layer) are excluded in a decompression process to be described later, a flow path through which the bubbles move is easily secured as the viscosity coefficient of the sealant is larger than the viscosity coefficient of the liquid agent.

As the sealant, highly elastic rubber, resin, gel, or the like may be used.

As the resin for the sealant, a material containing a curable resin such as a acrylic resin, a cyanoacrylate resin, an epoxy resin, a silicone resin, an urethane resin and a phenolic resin can be used. Examples of methods for curing the sealant includes a one-component type curing, a two-component mixing type curing, a heat curing, an ultraviolet curing, and a visible light curing.

A thermoplastic resin (hot-melt bond) may also be used as the sealant, and examples thereof include an ethylene vinyl acetate resin, a polyolefin resin, a polyamide resin, a synthetic rubber resin, an acrylic resin and a polyurethane resin.

As to the rubber, for example, natural rubber, synthetic natural rubber, butadiene rubber, styrene-butadiene rubber, butyl rubber, nitrile rubber, ethylene-propylene rubber, chloroprene rubber, acrylic rubber, chlorosulfonated polyethylene rubber (Hypalon), urethane rubber, silicone rubber, fluororubber, ethylene-vinyl acetate rubber, epichlorohydrin rubber, polysulfide rubber (Thiokol), and hydrogenated nitrile rubber can be used.

The order of the coating of the liquid agent for the intermediate layer and the coating of the sealant is not limited. The liquid agent for the intermediate layer may be applied to a portion where the liquid layer of the main surface of the sheet is desired to be formed, and the sealant may be applied so as to surround an outer periphery of the liquid agent for the intermediate layer. Alternatively, the sealant may be first applied to the main surface of the sheet, and the liquid agent for the intermediate layer may be applied to an inner periphery of the sealant.

A coating pattern of the liquid agent for the intermediate layer is not particularly limited, and the liquid agent for the intermediate layer may be applied in a layer pattern, or may be applied in a dot pattern, a lattice pattern, or a stripe pattern. Among these, a dot pattern is preferable from the viewpoint of easily securing a flow path through which bubbles escape.

The coating thickness of the liquid agent for the intermediate layer may be appropriately set so that the thickness of the intermediate layer falls within a desired range, and is preferably 5 μm to 500 μm.

In a plan view of the sheet 1A, the sealant is preferably applied so as to surround the outer periphery of the liquid agent for the intermediate layer. In this case, an area of a sealant-applied part in the plan view of the sheet 1A is preferably 20% or less, more preferably 10% or less, and particularly preferably 5% or less of an area of the liquid-agent-for-the-intermediate-layer-applied part so as not to hinder the vibration.

From the viewpoint of easily securing a flow path through which bubbles escape, the coating thickness of the sealant is preferably thicker than the coating thickness of the liquid agent for the intermediate layer, and is preferably 10 μm to 1000 μm.

As a method for applying the liquid agent for the intermediate layer and the sealant, a known method such as screen printing and a dispenser can be used.

(Sheet Bonding)

Next, the sheet 1B is bonded to the main surface of the sheet 1A to which the liquid agent for the intermediate layer and the sealant are applied to obtain a laminate (FIG. 1C). The bonding is preferably performed under normal pressure (under atmospheric pressure). In the vacuum lamination method studied by the present inventors, it is difficult to hold two sheets with high positional accuracy in a decompressed state, and it is difficult to laminate the sheets without positional deviation. However, two sheets can be laminated with good positional accuracy by bonding under normal pressure.

The laminate is not preferably heated. The sheet is easily deformed by heating, and the sealant is softened by heat, so that it is difficult to secure a flow path through which bubbles escape and to defoam.

(Defoaming Under Reduced Pressure)

The obtained laminate is subjected to reduced pressure. Accordingly, even if bubbles are present in the intermediate layer (liquid layer in this case) when the liquid agent is applied or when the sheet is bonded, the bubbles gradually move to the outer periphery of the sheet and are released to the outside of the laminate.

Specifically, the pressure of the laminate under reduced pressure is preferably 100 Pa or less, and more preferably 50 Pa or less. The time for which the laminate is subjected to reduced pressure depends on a defoaming rate, but is preferably 1 minute to 180 minutes. From the viewpoint of efficiently releasing bubbles by rapidly decompressing, the laminate is decompressed until the pressure reaches 100 Pa or less, and the time required for the decompression is preferably 30 minutes or less, more preferably 15 minutes or less, particularly preferably 10 minutes or less.

Examples of the method for subjecting the laminate to reduced pressure include a method using a decompression chamber, and a method in which the laminate is placed in a bag made of rubber or the like and the inside of the bag is degassed.

At this time, from the viewpoint of rapidly decompressing, (the space volume (L) in the decompression chamber/the exhaust capacity (L/min) in the decompression chamber) is preferably 1.8 or less, more preferably 1.5 or less, and still more preferably 0.9 or less.

(Pressurization)

The laminate after being subjected to reduced pressure is preferably pressurized from the outside. Accordingly, it is possible to push out the bubbles which cannot be completely removed only by decompression. Examples of a pressurizing method include a method in which the laminate is temporarily compressed using a roll and is compressed using an autoclave. The pressure inside the autoclave is preferably 0.1 MPa to 10 MPa, and the compression time is preferably 1 minute to 30 minutes. The temperature in the autoclave is preferably 120° C. to 150° C.

(Sealant Curing)

Next, the sealant is cured as necessary. This can prevent leakage of the intermediate layer (liquid layer in this case).

The curing means can be appropriately selected according to a material of the sealant. In the case where the sealant is a photocurable resin, the sealant is cured by light irradiation, and in the case where the sealant is a thermosetting resin, the sealant is cured by heating.

(Liquid Layer (Liquid Agent for Intermediate Layer) Curing)

The liquid layer from which the bubbles have been removed by the decompression may be an intermediate layer as it is (that is, an intermediate layer formed of a liquid layer), or may be an intermediate layer (that is, a solid layer) cured as necessary. Even when the intermediate layer is a solid layer, the manufacturing method of the present invention is preferable because bubbles are not contained. The curing means can be appropriately selected according to a material of the liquid layer (liquid agent for the intermediate layer). In the case where the liquid layer (liquid agent for the intermediate layer) is a photocurable resin, the liquid layer is cured by light irradiation, and in the case where the liquid layer is a thermosetting resin, the liquid layer is cured by heating. Examples of methods for curing the liquid layer include a one-component type curing, a two-component mixing type curing, a heat curing, an ultraviolet curing, and a visible light curing. In the case where the intermediate layer is a solid layer formed by curing the liquid layer, the same material as the sealant can be used as the liquid agent for the intermediate layer. The curing of the liquid layer (liquid agent for the intermediate layer) may be performed after the defoaming under reduced pressure, or may be performed after the pressurization. Furthermore, the curing of the liquid layer (liquid agent for the intermediate layer) may be performed simultaneously with or separately from the curing of the sealant. In the case where the curing of the liquid layer (liquid agent for the intermediate layer) and the curing of the sealant are performed separately, the order of the curing can be freely determined.

By the above method, a glass sheet composite is obtained.

<Glass Sheet Composite>

From the viewpoint of high rigidity maintenance and vibration transfer, a smaller thickness of the intermediate layer is more preferred. From this viewpoint, in the case where the total thickness of the pair of sheets is 1 mm or less, the thickness of the intermediate layer is preferably 1/10 or less, more preferably 1/20 or less, still more preferably 1/30 or less, yet still more preferably 1/50 or less, even still more preferably 1/70 or less, and particularly preferably 1/100 or less, of the total thickness of the pair of sheets.

In the case where the total thickness of the pair of sheets is more than 1 mm, the thickness of the intermediate layer is preferably 100 μm or less, more preferably 50 μm or less, still more preferably 30 μm or less, yet still more preferably 20 μm or less, even still more preferably 15 μm or less, and particularly preferably 10 μm or less.

The lower limit of the thickness of the intermediate layer is preferably 0.01 μm or more from the viewpoint of film-forming property and durability.

EXAMPLES

The embodiments of the present invention will be described in more detail below with reference to Examples, but the present invention is not limited to these Examples. Examples 1 and 2 are inventive examples, and Example 3 is comparative example. Examples 4, 5, 6, and 7 are inventive examples.

Materials and the like used in the following examples are as follows.

Liquid agent A for intermediate layer: KF96 manufactured by Shin-Etsu Chemical Co., Ltd. (viscosity coefficient 3 Pa·s)

Liquid agent B for intermediate layer: uncured UV curable modified acrylate (viscosity coefficient 4 Pa·s)

Liquid agent C for intermediate layer: uncured addition polymerization type silicone (viscosity coefficient 1.5 Pa·s)

Sealant A: uncured UV curable silicone (viscosity coefficient 7.5 Pa·s)

Sealant B: uncured UV curable modified acrylate (viscosity coefficient 12 Pa·s)

Sealant C: uncured UV curable silicone (viscosity coefficient 15 Pa·s)

(Example 1) Preparation of Glass Sheet Composite (an Intermediate Layer is a Liquid Layer Two glass sheets (soda lime glass, length 30 cm×width 30 cm×thickness 1.1 mm) were prepared as glass sheet composite members. On a first main surface of a first glass sheet, 0.9 g of the liquid agent A for the intermediate layer was applied using a screen printing machine (LS-34GX manufactured by Newlong Seimitsu Kogyo Co., Ltd., mesh ST250, 3 mmφ, dot pattern of 10 mm pitch). At this time, the coating thickness of the liquid agent was about 20 Thereafter, the sealant A was applied to a periphery of a liquid agent-applied part on the first main surface of the first glass sheet using a dispenser (DSP SMDS-CV2-400 manufactured by Musashi Engineering, Inc.) so as to surround the liquid agent. At this time, the coating thickness of the sealant was about 150 μm. An area of the sealant in a plan view of the first glass sheet was about 7% of an area of a liquid agent-applied part.

The main surface (first main surface) of the first glass sheet to which the liquid agent and the sealant were applied and one main surface of a second glass sheet were bonded under atmospheric pressure to obtain a laminate. The obtained laminate was placed in a decompression chamber and was decompressed to 100 Pa or less by degassing for 10 minutes.

(Space volume (L) in the decompression chamber/
exhaust capacity (L/min) in the decompression
chamber)=1.445

Thereafter, the sealant was cured by UV irradiation.

A glass sheet composite 1 was obtained by the above method.

(Example 2) Preparation of Glass Sheet Composite (an Intermediate Layer is a Liquid Layer Two glass sheets (soda lime glass, length 100 cm×width 100 cm×thickness 1.1 mm) were prepared as glass sheet composite members. On a first main surface of a first glass sheet, 0.9 g of the liquid agent A for the intermediate layer was applied in a dot pattern of 10 mm pitch at 0.9 mg per point using a high-speed jet dispenser (Dispensing Valve SJVH3000 manufactured by San-Ei Tech Co., Ltd., Dispensing Controller SJVC3000 manufactured by San-Ei Tech Co., Ltd.). At this time, the coating thickness of the liquid agent was about 20 Thereafter, the sealant A was applied to a periphery of a liquid agent-applied part on the first main surface of the first glass sheet using a small digital dispenser (ML-5000XII manufactured by Musashi Engineering, Inc.) so as to surround the liquid agent. At this time, the coating thickness of the sealant was about 120 μm. An area of the sealant in a plan view of the first glass sheet was about 10% of an area of a liquid agent-applied part.

The main surface (first main surface) of the first glass sheet to which the liquid agent and the sealant were applied and one main surface of a second glass sheet were bonded under atmospheric pressure to obtain a laminate.

The obtained laminate was placed in a laminator chamber (1834N manufactured by NISSHINBO), and was decompressed to 100 Pa or less by degassing for 12 minutes.

(Space volume (L) in the decompression chamber/
exhaust capacity (L/min) in the decompression
chamber)=1.734

Thereafter, the laminate was pressed under atmospheric pressure for 30 minutes while the laminator chamber was decompressed.

After pressed under atmospheric pressure, the laminate was taken out of the laminator chamber, and the sealant was cured by UV irradiation.

A glass sheet composite 2 was obtained by the above method.

(Example 3) Preparation of Glass Sheet Composite (an Intermediate Layer is a Liquid Layer, Vacuum Lamination Method Two glass sheets (soda lime glass, length 30 cm×width 30 cm×thickness 1.1 mm) were prepared as glass sheet composite members. On a first main surface of a first glass sheet, 0.5 mg of the liquid agent A for the intermediate layer per point was applied to a total of 1800 points at regular intervals using a dispenser (DSP SMDS-CV2-400 manufactured by Musashi Engineering, Inc.). At this time, the coating thickness of the liquid agent was about 15 Thereafter, the sealant A was applied to a periphery of a liquid agent-applied part on the first main surface of the first glass sheet using a dispenser (DSP SMDS-CV2-400 manufactured by Musashi Engineering, Inc.) so as to surround the liquid agent. At this time, the coating thickness of the sealant was about 120 μm. An area of the sealant in a plan view of the first glass sheet was about 7% of an area of a liquid agent-applied part.

Next, the main surface (first main surface) of the first glass sheet to which the liquid agent for the intermediate layer and the sealant were applied and one main surface (first main surface) of a second glass sheet were arranged to be bonded to each other, the other main surface (second main surface) of the second glass sheet was fixed to an upper plate of a vacuum lamination apparatus with a double-sided tape, the main surface of the first glass sheet to which the liquid agent and the sealant were applied below the other main surface of the second glass sheet were arranged so as to face upward, and then the pressure was reduced to 100 Pa or less by degassing for 15 minutes.

(Space volume (L) in the decompression chamber/
exhaust capacity (L/min) in the decompression
chamber)=2.167

Thereafter, the second glass sheet was slowly lowered vertically and bonded to the applied surface of the first glass sheet to which the liquid agent and the sealant were applied to obtain a laminate.

Thereafter, the sealant was cured by UV irradiation.

A glass sheet composite 3 was obtained by the above method.

(Example 4) Preparation of Glass Sheet Composite Having Curved Surface (an Intermediate Layer is a Liquid Layer Two glass sheets having a curvature radius of about 1000 mm in a longitudinal direction (soda lime glass, length 60 cm×width 40 cm×thickness 1.1 mm) were prepared as glass sheet composite members. On a first main surface which is a concave side of a first glass sheet, 0.9 g of the liquid agent A for the intermediate layer was applied in a dot pattern of 10 mm pitch at 0.9 mg per point using a dispenser (AC-CURA-8 manufactured by Iwashita Engineering, Inc.). At this time, the coating thickness of the liquid agent was about 15 Thereafter, the sealant A was applied to a periphery of a liquid agent-applied part on the first main surface which is the concave side of the first glass sheet using the dispenser (ACCURA-8 manufactured by Iwashita Engineering, Inc.) so as to surround the liquid agent. At this time, the coating thickness of the sealant was about 150 μm. An area of the sealant in a plan view of the first glass sheet was about 9% of an area of a liquid agent-applied part.

The main surface (first main surface) of the first glass sheet to which the liquid agent and the sealant were applied and the other main surface which is a convex side of a second glass sheet were bonded under atmospheric pressure to obtain a laminate. The obtained laminate was placed in a decompression chamber and was decompressed to 100 Pa or less by degassing for 10 minutes.

(Space volume (L) in the decompression chamber/ exhaust capacity (L/min) in the decompression chamber)=1.445

Thereafter, the sealant was cured by UV irradiation.

A glass sheet composite 4 was obtained by the above method.

(Example 5) Preparation of Glass Sheet Composite Having Curved Surface Subjected to Thermocompression Bonding (an Intermediate Layer is a Liquid Layer Two glass sheets having a curvature radius of about 1000 mm in a longitudinal direction (soda lime glass, length 60 cm×width 40 cm×thickness 1.1 mm) were prepared as glass sheet composite members. On a first main surface which is a concave side of a first glass sheet, 0.9 g of the liquid agent A for the intermediate layer was applied in a dot pattern of 10 mm pitch at 0.9 mg per point using a dispenser (AC-CURA-8 manufactured by Iwashita Engineering, Inc.). At this time, the coating thickness of the liquid agent was about 15 Thereafter, the sealant A was applied to a periphery of a liquid agent-applied part on the first main surface which is the concave side of the first glass sheet using the dispenser (ACCURA-8 manufactured by Iwashita Engineering, Inc.) so as to surround the liquid agent. At this time, the coating thickness of the sealant was about 150 μm. An area of the sealant in a plan view of the first glass sheet was about 9% of an area of a liquid agent-applied part.

The main surface (first main surface) of the first glass sheet to which the liquid agent and the sealant were applied and the other main surface which is a convex side of a second glass sheet were bonded under atmospheric pressure to obtain a laminate. The obtained laminate was placed in a laminator chamber (1834N manufactured by NISSHINBO), and was decompressed to 100 Pa or less by degassing for 12 minutes.

(Space volume (L) in the decompression chamber/ exhaust capacity (L/min) in the decompression chamber)=1.734

Thereafter, the laminate taken out from the decompression chamber was placed in an aluminum pack, degassed for 10 minutes under reduced pressure of 10 kPa absolute pressure, then placed in an autoclave, and subjected to thermocompression bonding at a pressure of 1.3 MPa and a temperature of 135° C. for about 30 minutes.

After the thermocompression bonding, the laminate was taken out from the aluminum pack, and the sealant was cured by UV irradiation.

A glass sheet composite 5 was obtained by the above method.

(Example 6) Preparation of Glass Sheet Composite (an Intermediate Layer is a Solid Layer Made of a Cured UV Curable Resin Two glass sheets (soda lime glass, length 100 cm×width 100 cm×thickness 1.1 mm) were prepared as glass sheet composite members. On a first main surface of a first glass sheet, 0.9 g of the liquid agent B for the intermediate layer was applied in a dot pattern of 10 mm pitch at 0.9 mg per point using a high-speed jet dispenser (Dispensing Valve SJVH3000 manufactured by San-Ei Tech Co., Ltd., Dispensing Controller SJVC3000 manufactured by San-Ei Tech Co., Ltd.). At this time, the coating thickness of the liquid agent was about 20 μm. Thereafter, the sealant B was applied to a periphery of a liquid agent-applied part on the first main surface of the first glass sheet using a small digital dispenser (ML-5000XII manufactured by Musashi Engineering, Inc.) so as to surround the liquid agent. At this time, the coating thickness of the sealant was about 120 μm. An area of the sealant in a plan view of the first glass sheet was about 10% of an area of a liquid agent-applied part.

The main surface (first main surface) of the first glass sheet to which the liquid agent and the sealant were applied and one main surface of a second glass sheet were bonded under atmospheric pressure to obtain a laminate. The obtained laminate was placed in a decompression chamber and was decompressed to 100 Pa or less by degassing for 10 minutes.

(Space volume (L) in the decompression chamber/ exhaust capacity (L/min) in the decompression chamber)=1.445

Thereafter, the liquid agent for the intermediate layer and the sealant were cured by UV irradiation to obtain an intermediate layer formed of a solid layer.

A glass sheet composite 6 was obtained by the above method.

(Example 7) Preparation of Glass Sheet Composite (an Intermediate Layer is a Solid Layer Made of a Cured Thermosetting Resin Two glass sheets (soda lime glass, length 100 cm×width 100 cm×thickness 1.1 mm) were prepared as glass sheet composite members. On a first main surface of a first glass sheet, 0.9 g of the liquid agent C for the intermediate layer was applied in a dot pattern of 10 mm pitch at 0.9 mg per point using a high-speed jet dispenser (Dispensing Valve SJVH3000 manufactured by San-Ei Tech Co., Ltd., Dispensing Controller SJVC3000 manufactured by San-Ei Tech Co., Ltd.). At this time, the coating thickness of the liquid agent was about 20 μm. Thereafter, the sealant C was applied to a periphery of a liquid agent-applied part on the first main surface of the first glass sheet using a small digital dispenser (ML-5000XII manufactured by Musashi Engineering, Inc.) so as to surround the liquid agent. At this time, the coating thickness of the sealant was about 120 μm. An area of the sealant in a plan view of the first glass sheet was about 10% of an area of a liquid agent-applied part.

The main surface (first main surface) of the first glass sheet to which the liquid agent and the sealant were applied and one main surface of a second glass sheet were bonded under atmospheric pressure to obtain a laminate. The obtained laminate was placed in a decompression chamber and was decompressed to 100 Pa or less by degassing for 10 minutes.

No bubbles were visually observed in the liquid layer (intermediate layer) of the glass sheet composite 4 obtained in Example 4. No positional deviation of the two glass sheets was confirmed.

No bubbles were visually observed in the liquid layer (intermediate layer) of the glass sheet composite 5 obtained in Example 5. No positional deviation of the two glass sheets was confirmed.

No bubbles were visually observed in the solid layer (intermediate layer) of the glass sheet composite 6 obtained in Example 6. No positional deviation of the two glass sheets was confirmed.

No bubbles were visually observed in the solid layer (intermediate layer) of the glass sheet composite 7 obtained in Example 7. No positional deviation of the two glass sheets was confirmed.

TABLE 1

| | | Example 1 | Example 2 | Example 3 | Example 4 | Example 5 | Example 6 | Example 7 |
|---|---|---|---|---|---|---|---|---|
| Sealant | Type | A | A | A | A | A | B | C |
| | Viscosity coefficient (Pa · s) | 7.5 | 7.5 | 7.5 | 7.5 | 7.5 | 12 | 15 |
| Liquid agent for intermediate layer | Type | A | A | A | A | A | B | C |
| | Viscosity coefficient (Pa · s) | 3 | 3 | 3 | 3 | 3 | 4 | 1.5 |
| Coating pattern of liquid agent for intermediate layer | | Dot | Dot | Dot | Dot | Dot | Dot | Dot |
| Pressure at the time of bonding | | Normal pressure | Normal pressure | Reduced pressure | Normal pressure | Normal pressure | Normal pressure | Normal pressure |
| Start of decompression | | After laminate formation | After laminate formation | At the time of laminate formation | After laminate formation | After laminate formation | After laminate formation | After laminate formation |
| Space volume (L) in decompression chamber/ exhaust capacity (L/min) in decompression chamber | | 1.445 | 1.734 | 2.167 | 1.445 | 1.734 | 1.445 | 1.445 |
| Time required for degassing to 100 Pa or less | | 10 min | 12 min | 15 min | 10 min | 12 min | 10 min | 10 min |
| Curing of liquid agent for intermediate layer | | No | No | No | No | No | UV curing | Thermal curing |
| Intermediate layer | | Liquid layer | Liquid layer | Liquid layer | Liquid layer | Liquid layer | Solid layer | Solid layer |
| Presence or absence of bubbles in intermediate layer (liquid layer/solid layer) | | Absence | Absence | Presence | Absence | Absence | Absence | Absence |
| Positional deviation | | Absence | Absence | Presence | Absence | Absence | Absence | Absence |

(Space volume (L) in the decompression chamber/ exhaust capacity (L/min) in the decompression chamber)=1.445

Thereafter, the sealant was cured by UV irradiation. Next, heating was performed at 80° C. for 1 hour to cure the liquid agent for the intermediate layer, thereby obtaining an intermediate layer formed of a solid layer.

A glass sheet composite 7 was obtained by the above method.

No bubbles were visually observed in the liquid layer (intermediate layer) of the glass sheet composite 1 obtained in Example 1. No positional deviation of the two glass sheets was confirmed.

No bubbles were visually observed in the liquid layer (intermediate layer) of the glass sheet composite 2 obtained in Example 2. No positional deviation of the two glass sheets was confirmed.

Bubbles were visually observed in the liquid layer (intermediate layer) of the glass sheet composite 3 obtained in Example 3. Positional deviation of the two glass sheets was confirmed.

Although the present invention has been described in detail with reference to specific embodiments, it is apparent to those skilled in the art that various changes and modifications can be made without departing from the spirit and scope of the present invention. The present application is based on a Japanese Patent Application (No. 2020-176882) filed on Oct. 21, 2020, the contents of which are incorporated herein by reference.

INDUSTRIAL APPLICABILITY

The glass sheet composite obtained by the manufacturing method of the present invention has a large longitudinal wave acoustic velocity and a high loss coefficient. Therefore, the glass sheet composite is usable, for example, as a diaphragm used for speakers, microphones, earphones, mobile devices, and the like, as an opening member for buildings and vehicles, and as a glass substrate for magnetic recording mediums.

REFERENCE SIGNS LIST 1A, 1B: sheet
2: liquid agent for intermediate layer
3: sealant
10: glass sheet composite
11: laminate
21: intermediate layer

What is claimed is:

1. A method for manufacturing a glass sheet composite comprising two or more sheets and an intermediate layer between at least a pair of sheets of the sheets, the pair of the sheets consisting of a sheet 1A and a sheet 1B, at least one of the sheet 1A and the sheet 1B being a glass sheet, and the method comprising:

applying a liquid agent for the intermediate layer and a sealant to at least a part of a main surface of the sheet 1A, wherein the liquid agent for the intermediate layer comprises a curable resin;

bonding the sheet 1B to the main surface of the sheet 1A to which the liquid agent for the intermediate layer and the sealant are applied to obtain a laminate, wherein the bonding is performed at atmospheric pressure;

subjecting the laminate to reduced pressure after the bonding; and curing the liquid agent for the intermediate layer after the laminate is subjected to the reduced pressure.

2. The method for manufacturing a glass sheet composite according to claim 1, wherein the reduced pressure is achieved by a decompression chamber, and (space volume (L) in the decompression chamber/exhaust capacity (L/min) in the decompression chamber) is 1.8 or less.

3. The method for manufacturing a glass sheet composite according to claim 1, wherein when the laminate is subjected to the reduced pressure, a pressure is reduced to 100 Pa or less in 1 minute to 180 minutes.

4. The method for manufacturing a glass sheet composite according to claim 1, wherein a viscosity coefficient of the sealant is larger than a viscosity coefficient of the liquid agent for the intermediate layer.

5. The method for manufacturing a glass sheet composite according to claim 1, wherein the sealant has a viscosity coefficient of $1 \times 10^{-1}$ Pa·s or more, and the liquid agent for the intermediate layer has a viscosity coefficient of $1 \times 10^3$ Pa·s or less.

6. The method for manufacturing a glass sheet composite according to claim 1, wherein the liquid agent for the intermediate layer comprises a silicone.

7. The method for manufacturing a glass sheet composite according to claim 1, wherein the liquid agent for the intermediate layer has a coating pattern of a layer pattern, a dot pattern, a lattice pattern, or a stripe pattern.

8. The method for manufacturing a glass sheet composite according to claim 1, wherein a coating thickness of the sealant is larger than a coating thickness of the liquid agent for the intermediate layer.

9. The method for manufacturing a glass sheet composite according to claim 1, wherein the liquid agent for the intermediate layer has a coating thickness of 5 μm to 500 μm.

10. The method for manufacturing a glass sheet composite according to claim 1, wherein the sealant has a coating thickness of 10 μm to 1000 μm.

11. The method for manufacturing a glass sheet composite according to claim 1, further comprising pressurizing the laminate after the laminate is subjected to the reduced pressure.

12. The method for manufacturing a glass sheet composite according to claim 11, wherein the pressurization is performed by compressing the laminate at a pressure of 0.1 MPa to 10 MPa for 1 minute to 30 minutes.

13. The method for manufacturing a glass sheet composite according to claim 1, wherein the sealant comprises a curable resin, and the method further comprises curing the sealant after the laminate is subjected to the reduced pressure.

14. The method for manufacturing a glass sheet composite according to claim 1, wherein each of the sheets has a curved surface.

15. The method for manufacturing a glass sheet composite according to claim 1, wherein the curable resin is a photo-curable resin.

* * * * *